United States Patent
Meid et al.

(10) Patent No.: US 11,543,023 B2
(45) Date of Patent: Jan. 3, 2023

(54) HYDRAULIC ARRANGEMENT FOR A VEHICLE TRANSMISSION

(71) Applicant: DEERE & COMPANY, Moline, IL (US)

(72) Inventors: Michael Meid, Waghaeusel (DE); Manuel Billich, Dischingen (DE)

(73) Assignee: DEERE & COMPANY, Moline, IL (US)

( * ) Notice: Subject to any disclaimer, the term of this patent is extended or adjusted under 35 U.S.C. 154(b) by 57 days.

(21) Appl. No.: 17/173,263

(22) Filed: Feb. 11, 2021

(65) Prior Publication Data

US 2021/0324953 A1    Oct. 21, 2021

(30) Foreign Application Priority Data

Apr. 15, 2020    (DE) .......................... 102020204756.1

(51) Int. Cl.
| | | |
|---|---|---|
| *F16H 61/00* | (2006.01) | |
| *F15B 13/042* | (2006.01) | |
| *F16H 57/04* | (2010.01) | |
| *F16K 11/10* | (2006.01) | |
| *F16K 17/04* | (2006.01) | |

(52) U.S. Cl.
CPC ....... *F16H 61/0021* (2013.01); *F15B 13/042* (2013.01); *F16H 57/0435* (2013.01); *F16H 57/0446* (2013.01); *F16K 11/105* (2013.01); *F16K 17/042* (2013.01); *F16H 2061/0037* (2013.01); *Y10T 137/8601* (2015.04)

(58) Field of Classification Search
CPC ....... Y10T 137/2663; Y10T 137/86002; Y10T 137/8601; F16H 57/0435; F16H 57/0446; F16H 61/2663; F16H 2061/042
See application file for complete search history.

(56) References Cited

U.S. PATENT DOCUMENTS

| | | | |
|---|---|---|---|
| 9,500,277 B2 | 11/2016 | Jo et al. | |
| 2004/0089355 A1* | 5/2004 | Nirasawa | G05D 16/101 137/625.69 |
| 2012/0060488 A1 | 3/2012 | Grethel et al. | |
| 2015/0030472 A1 | 1/2015 | Wi | |
| 2015/0167835 A1* | 6/2015 | Hwang | F04B 49/24 137/565.14 |

FOREIGN PATENT DOCUMENTS

KR    20150014163 A    2/2015

OTHER PUBLICATIONS

European Search Report issued in European Patent Application No. 21161029.0, dated Aug. 30, 2021, 9 pages.

* cited by examiner

*Primary Examiner* — Robert K Arundale

(57) ABSTRACT

A hydraulic arrangement for a vehicle transmission includes a hydraulic pump for providing a system pressure for a first hydraulic system circuit and a lubrication pressure for a second hydraulic lubrication circuit. The arrangement also includes a control valve connected between a pump outlet of the pump and the two hydraulic circuits and has two different switching positions. The control valve, depending on its switching position, acts as a hydraulic connection between the pump and the system circuit or between the pump and the lubrication circuit.

20 Claims, 3 Drawing Sheets

HYDRAULIC ARRANGEMENT FOR A VEHICLE TRANSMISSION

RELATED APPLICATIONS

This application claims priority to German Application No. 102020204756.1, filed Apr. 15, 2020, the disclosure of which is hereby expressly incorporated by reference in its entirety.

FIELD OF THE DISCLOSURE

The present disclosure relates to a hydraulic arrangement for a vehicle transmission.

BACKGROUND

Vehicle transmissions require a hydraulic medium (for example, oil) in order to control the clutches thereof in a hydraulic system circuit and to ensure sufficient lubrication in a hydraulic lubrication circuit. The two circuits have different hydraulic requirements. For example, the system circuit requires a low flow rate of the hydraulic medium outside shifting operations and a high flow rate thereof during shifting operations. By contrast, the lubrication circuit can require a continually high flow rate at a low pressure.

There is a need for improving the functioning efficiency of a hydraulic vehicle transmission.

SUMMARY

According to the present disclosure, the hydraulic arrangement has a hydraulic pump for providing a system pressure for a hydraulic system circuit and a lubrication pressure for a hydraulic lubrication circuit. The system circuit serves in particular to control or actuate one or more clutches within the vehicle transmission. The lubrication circuit serves in particular for continuous lubrication of the vehicle transmission. A control valve is hydraulically connected between a pump outlet of the pump and the two hydraulic circuits. Here, the control valve has at least two different switching positions such that, depending on its switching position, it acts as a hydraulic connection between the pump and the system circuit or between the pump and the lubrication circuit.

The control valve that is switchable between different switching positions allows the pump to be hydraulically connected either to the system circuit or to the lubrication circuit as required. As a result, the vehicle transmission can be operated cost-effectively with a single pump and at the same time efficiently with low energy losses. Furthermore, the technical complexity of the hydraulic arrangement remains relatively low. This creates the technical condition that two hydraulic circuits can be supplied, in spite of a single pump, with a degree of efficiency as can otherwise be achieved with two provided hydraulic pumps.

As mentioned above, the hydraulic arrangement is used in a vehicle transmission. The hydraulic pump may be a transmission oil pump. The vehicle may be a utility vehicle such as an agricultural utility vehicle (for example, a tractor), a forestry utility vehicle or a construction vehicle.

In an embodiment, the hydraulic arrangement contains a storage unit (for example, a diaphragm accumulator, accumulator), which is connected to the system circuit. As a result, a working pressure above a minimum working pressure can be maintained for a relatively long time for the system circuit, without the pump being required for this purpose. This reduces the switching frequency of the control valve between its switching positions and additionally supports efficient functioning of the hydraulic arrangement.

In an analogous manner, a storage unit can also be connected to the lubrication circuit in order to stabilize this circuit in terms of its hydraulic pressure.

In some embodiments, the control valve changes its switching position if the system pressure reaches or drops below a predetermined minimum system pressure, or if the system pressure reaches or exceeds a predetermined maximum system pressure.

With the predetermined values of a minimum and maximum system pressure, the efficiency of the pump can be improved further with the alternate hydraulic connection to the system circuit and to the lubrication circuit.

For the alternate hydraulic connection of the pump to the two hydraulic circuits, the switching pattern of the control valve is defined in particular in such a way that the control valve, based on a falling system pressure after the latter reaches or drops below the minimum system pressure, takes up a first switching position for a hydraulic connection of the pump to the system circuit, or the control valve, based on a rising system pressure after the latter reaches or exceeds the maximum system pressure, takes up a second switching position for a hydraulic connection of the pump to the lubrication circuit.

In some embodiments, the control valve is in the form of a 3/2-way valve with three ports and two switching positions and as a result can be provided cost-effectively as a standard component.

Advantageously, the control valve cooperates in its different switching positions with a holding valve unit. Here, the control valve is releasably held or locked in its second switching position in that the holding valve unit takes up a specific switching position. For technically simple cooperation with the control valve, the holding valve unit is actuable depending on the system pressure. As a result, the releasable fixing of the control valve in its second switching position can be automatically achieved and also reversed again.

In an embodiment, the holding valve unit has mechanical locking means or mechanism in order to releasably lock the control valve in its second switching position. In this case, the control valve can have suitable counterpart means or mechanism that cooperate with the abovementioned locking means or mechanism. For example, the holding valve unit bears a locking protrusion, which engages releasably in a cutout in a locking bracket or locking arm of the control valve.

In a further embodiment, the holding valve unit has an actuable electromagnet. The electromagnet is actuated, for example, by control electronics depending on the current system pressure. A specific switching position that is achievable by the electromagnet can then keep the control valve in its second switching position in a technically stable manner.

BRIEF DESCRIPTION OF THE DRAWINGS

The above-mentioned aspects of the present disclosure and the manner of obtaining them will become more apparent and the disclosure itself will be better understood by reference to the following description of the embodiments of the disclosure, taken in conjunction with the accompanying drawing, wherein.

Corresponding reference numerals are used to indicate corresponding parts in the drawings.

DETAILED DESCRIPTION

The embodiments of the present disclosure described below are not intended to be exhaustive or to limit the disclosure to the precise forms disclosed in the following detailed description. Rather, the embodiments are chosen and described so that others skilled in the art may appreciate and understand the principles and practices of the present disclosure.

Figure 1:
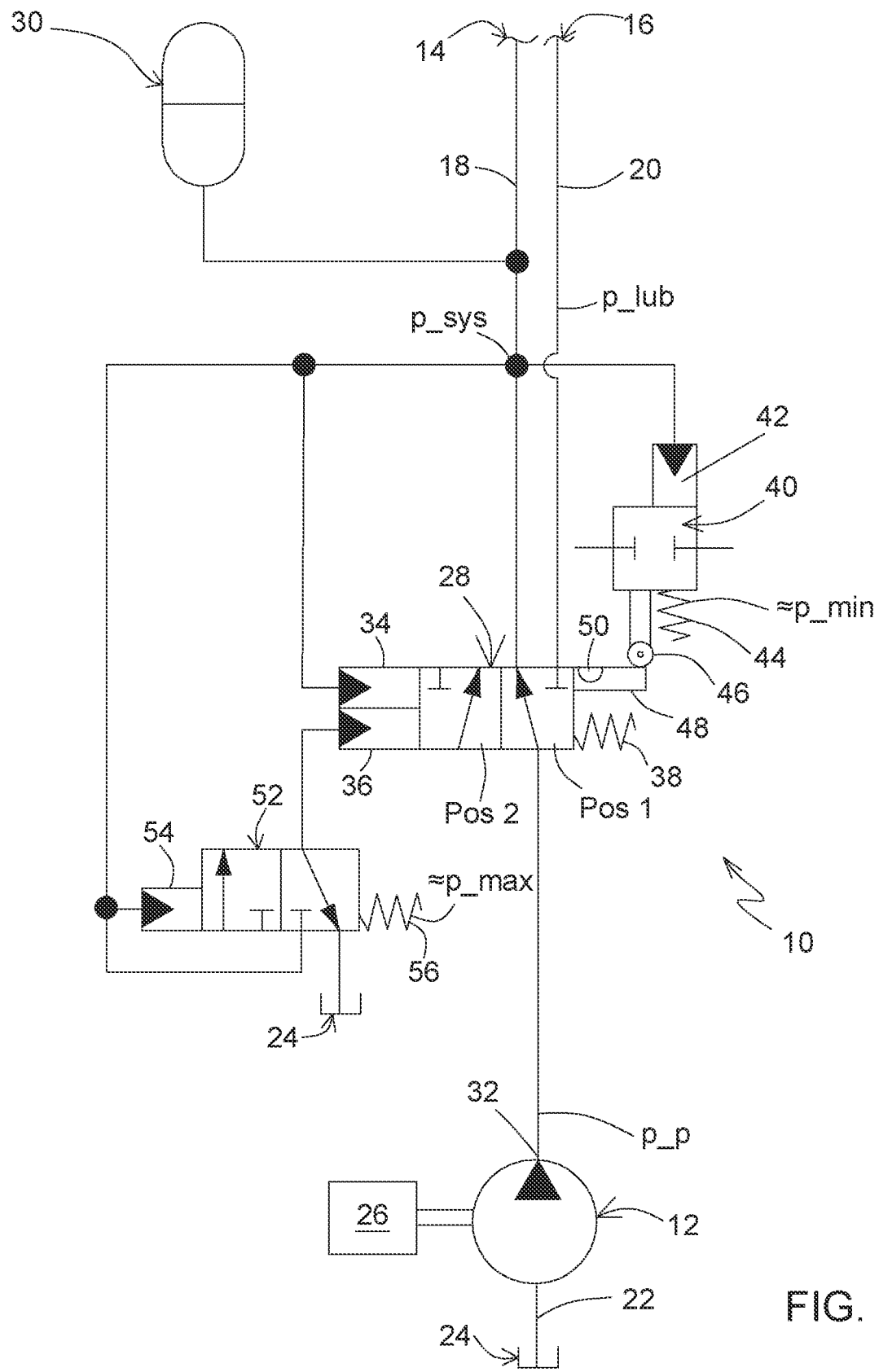
FIG. 1 shows a hydraulic diagram with the hydraulic arrangement in a first embodiment.

FIG. 1 shows a hydraulic arrangement 10 for a vehicle transmission that is not explicitly illustrated here. The arrangement 10 can be arranged partially inside and partially outside the vehicle transmission or entirely inside the vehicle transmission.

The arrangement 10 contains a hydraulic pump 12 for delivering a hydraulic medium (for example, oil) in the direction of a hydraulic system circuit 14 and of a lubrication circuit 16. The system circuit 14 is indicated by a system line 18 and leads to at least one clutch of the vehicle transmission and optionally to further components of the system circuit 14. The lubrication circuit 16 is indicated by a lubrication line 20 and serves for the continuous lubrication of the relevant components of the vehicle transmission.

The pump 12 is connected by a suction line 22 to a hydraulic reservoir 24 or sump containing the hydraulic medium.

For example, the pump 12, which is driven by a drive unit 26, has a fixed displacement volume. Alternatively, however, the pump 12 can also be a pivoting pump such that individual operating parameters (for example, rotational speed, flow rate, pump pressure p_p) of the pump 12 are automatically readjusted depending on the hydraulic circuit 14 or 16 currently to be supplied. The pump operation is then adapted as required and in an efficiency-enhancing manner to the hydraulic demands of the system circuit and of the lubrication circuit.

For pressure stabilization, a storage unit 30 (for example, a diaphragm accumulator, accumulator) is hydraulically connected to the system circuit 14. Optionally, a storage unit (not illustrated here) is also hydraulically connected to the lubrication circuit 16.

The control valve 28 is connected between a pump outlet 32 of the pump 12 and the two hydraulic circuits 14, 16. In the starting position of the control valve 28 as per switching position Pos1 (FIGS. 1-2), all of the hydraulic medium is delivered to the system circuit 14. In the switching position Pos2 of the control valve 28, the pump 12 delivers all of the hydraulic medium to the lubrication circuit 16.

The system pressure p_sys has a range from a predetermined minimum system pressure p_min to a predetermined maximum system pressure p_max. This range is apparent in FIG. 3A. In order that the system pressure p_sys remains within this range, the switching position of the control valve 28 changes if it reaches or drops below the predetermined minimum system pressure p_min and if it reaches or exceeds the predetermined maximum system pressure p_max.

In this case, the control valve 28, based on a falling system pressure p_sys after the latter reaches or drops below the minimum system pressure p_min, is switched into its first switching position Pos1 for a hydraulic connection of the pump 12 to the system circuit 14. All of the hydraulic medium is then pumped to the storage unit 30 and to the system circuit 14 until, with a rising system pressure p_sys, the maximum system pressure p_max has been reached. Once the maximum system pressure p_max has been reached or exceeded, the control valve 28 takes up its second switching position Pos2 for a hydraulic connection of the pump 12 to the lubrication circuit 16.

Figure 2:
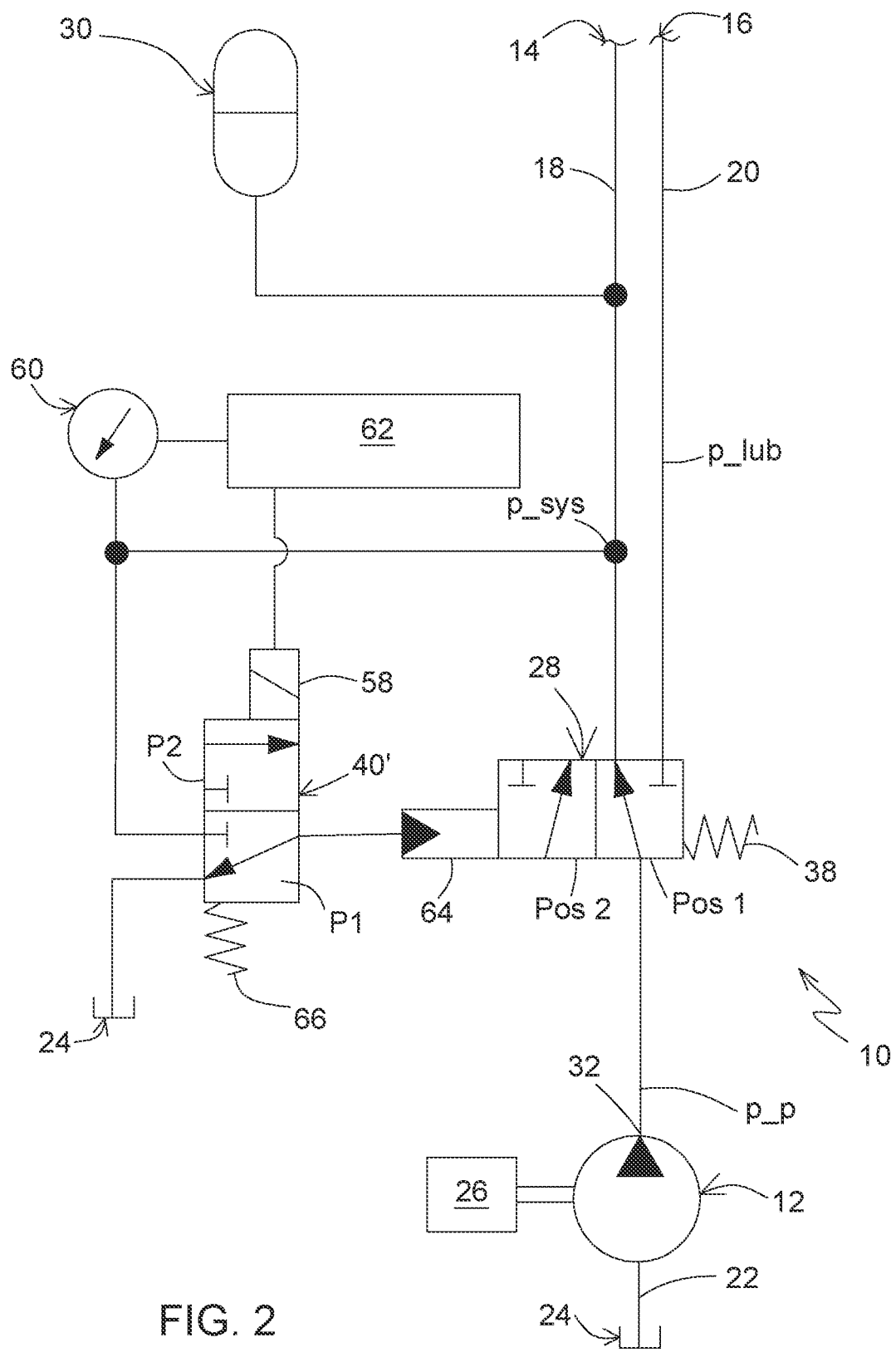
FIG. 2 shows a hydraulic diagram with the hydraulic arrangement in a second embodiment.

In the two embodiments according to FIGS. 1-2, the control valve 28 is in the form of a 3/2-way valve with three ports and two switching positions Pos1, Pos2. Nevertheless, the control valve 28 in FIGS. 1-2 is actuable in different ways and accordingly configured in different ways in order to realize the above-described switching pattern.

The control valve 28 according to FIG. 1 has a first and a second control input 34, 36, the hydraulic control pressures of which act counter to a restoring spring 38.

In the switching position Pos2, the control valve 28 is held releasably by a holding valve unit 40 until the system pressure drops below the minimum system pressure p_min. For this purpose, the holding valve unit 40 has a control input 42 at which the current system pressure p_sys prevails. Counter to the pressure at the control input 42 there acts the spring pressure of a restoring spring 44. This spring pressure is set approximately to the minimum system pressure p_min. As soon as the rising current system pressure p_sys reaches or exceeds the spring pressure of the restoring spring 44 or the minimum system pressure p_min, a locking protrusion 46 of the holding valve unit 40 presses against a locking arm 48 of the control valve 28. When the control valve 28 is transferred into its second switching position Pos2, then the locking protrusion 46 catches with the locking arm 48. In the process, the locking protrusion 46 engages, for example, in a cutout 50 in the locking arm 48.

The mechanical locking means or mechanism 46, 48, 50 releasably lock the control valve 28 in its second switching position Pos2 until the current system pressure p_sys drops below the minimum system pressure p_min. In this situation, the locking of the control valve 28 is released, and so the control valve 28 is transferred back into its first switching position Pos1 by the suitably dimensioned spring pressure of its restoring spring 38, in order to build the current system pressure p_sys up to the predetermined maximum system pressure p_max.

In order that the control valve 28, starting from its first switching position Pos1, is switched into its second switching position Pos2, a further valve unit in the form of a high-pressure valve 52 is provided. It is in the form of a 3/2-way valve with three ports and two switching positions. At the control input 54 thereof, the current system pressure p_sys prevails. The control input 54 acts counter to the spring pressure of a restoring spring 56. This spring pressure is set approximately to the maximum system pressure p_max.

As soon as the rising current system pressure p_sys reaches or exceeds the maximum system pressure p_max, the high-pressure valve 52 is switched from its starting position illustrated in FIG. 1 into its second switching position, such that the maximum system pressure p_max also prevails at the second control input 36 of the control valve 28. As a result, the control valve 28 is automatically switched into its second switching position Pos2 at a current system pressure p_sys that corresponds approximately to the maximum system pressure p_max. The current system pressure p_sys then falling again causes the high-pressure valve 52 to be switched back into its starting position illustrated in FIG. 1. In this situation, the second control input 36 is hydraulically connected to the hydraulic reservoir 24 again. At the same time, the control valve 28 is releasably held or locked in its second switching position Pos2 on account of the above-described locking means 46, 48, 50.

In contrast to the illustration in FIG. 1, the mechanical locking means or mechanism 46, 48, 50 are integrated into the structure of the control valve 28 and are in the form of a lock, formed coaxially in the control valve 28, with a ball-groove contact.

In FIG. 1, the holding valve unit 40 has mechanical locking means or mechanism 46 for releasably maintaining the second switching position Pos2 of the control valve 28. By contrast, in FIG. 2, a holding valve unit 40' has electronic means or mechanism in the form of an electromagnet 58 in order to releasably hold or lock the control valve 28 in its second switching position Pos2.

The arrangement 10 according to FIG. 2 has a pressure transducer 60, which is connected to the current system pressure p_sys and to suitable control electronics 62. The control electronics 62 actuate the electromagnet 58 and act thereon depending on the current system pressure p_sys. The electromagnet 58 switches the holding valve unit 40', which is in the form of a 3/2-way valve with three ports and two switching positions.

The control electronics 62 are designed such that they act on or activate the electromagnet 58 as soon as the rising current system pressure p_sys reaches or exceeds the maximum system pressure p_max. As a result, the holding valve unit 40' is transferred into its switching position P2. Consequently, the maximum system pressure p_max transfers the control valve 28, via a control input 64 of the latter, into the second switching position Pos2 counter to the spring pressure of the restoring spring 38. As soon as the falling current system pressure p_sys reaches or drops below the minimum system pressure p_min, the control electronics 62 deactivate the electromagnet 58. As a result, the holding valve unit 40' is switched back automatically into its starting position as per switching position P1 by the restoring spring 66. Consequently, the control valve 28 is switched back automatically into its first switching position Pos1 by its restoring spring 38.

Figure 3A:
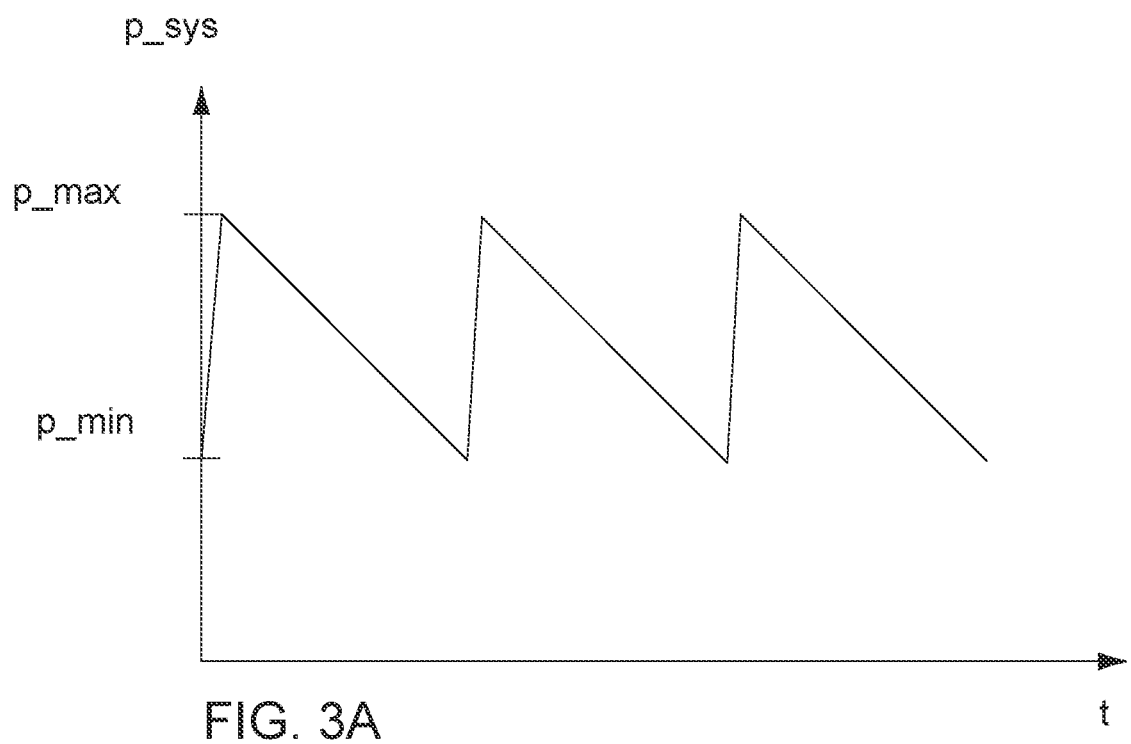
FIG. 3A shows a diagram with a pressure characteristic curve of the hydraulic system circuit.
Figure 3B:
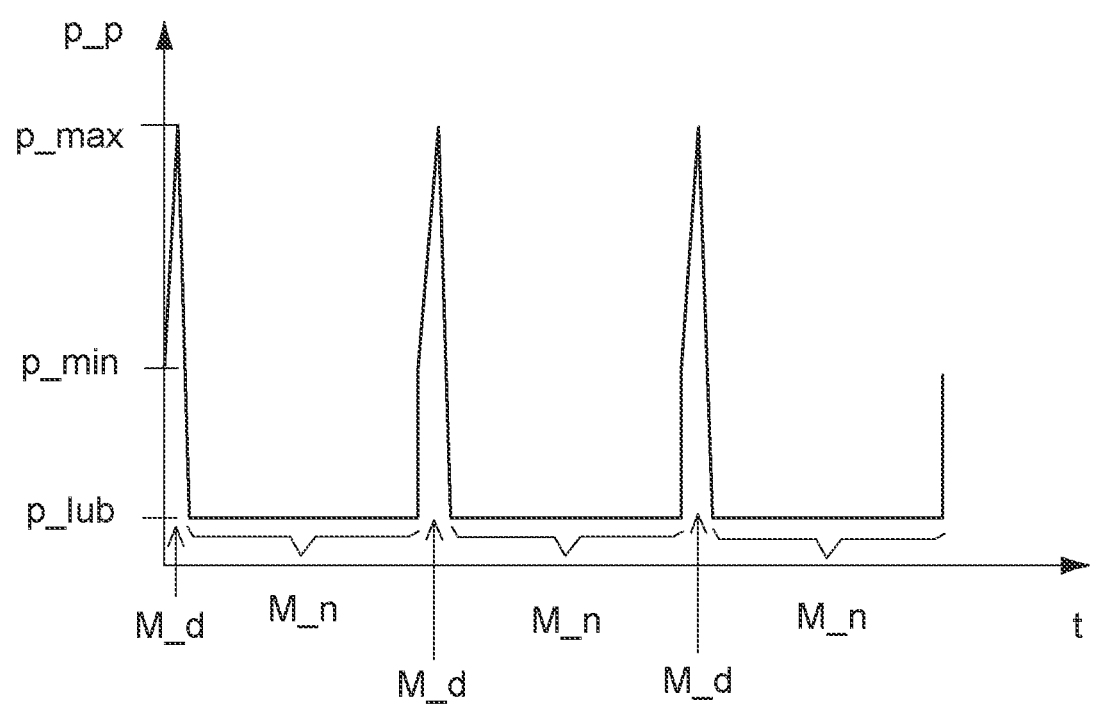
FIG. 3B shows a diagram with a pressure characteristic curve of the hydraulic pump.

In the two embodiments according to FIGS. 1-2, the system behavior, illustrated in FIG. 3A, of the system circuit 14 arises. Between the maximum system pressure p_max and the minimum system pressure p_min, the system pressure p_sys has a sawtooth-like profile. In order to bring the system pressure p_sys to the maximum system pressure p_max, the pump 12 is briefly in a boost pressure mode M_d and is otherwise in a normal operating mode M_n. In the operating mode M_n, the drive unit 26 drives the pump 12 such that the latter has to maintain the relatively low lubrication pressure p_lub. This solution gives the hydraulic arrangement 10 similar efficiency to what is achievable in a technically more complex and costlier solution with two pumps.

It should be noted that the details disclosed in the drawings are illustrated in a partially schematic manner and not necessarily to scale.

While embodiments incorporating the principles of the present disclosure have been disclosed hereinabove, the present disclosure is not limited to the disclosed embodiments. Instead, this application is intended to cover any variations, uses, or adaptations of the disclosure using its general principles. Further, this application is intended to cover such departures from the present disclosure as come within known or customary practice in the art to which this disclosure pertains and which fall within the limits of the appended claims.

The invention claimed is:

1. A hydraulic arrangement for a vehicle transmission, comprising:
    a hydraulic pump for providing a system pressure for a first hydraulic system circuit and a lubrication pressure for a second hydraulic lubrication circuit;
    a control valve connected between a pump outlet of the pump and the two hydraulic circuits and having two different switching positions; and
    a holding valve unit including a mechanical locking mechanism for releasably locking the control valve in the second switching position;
    wherein the control valve, depending on its switching position, acts as a hydraulic connection between the pump and the system circuit or between the pump and the lubrication circuit.

2. The arrangement as claimed in claim 1, further comprising a storage unit hydraulically connected to the system circuit.

3. The arrangement as claimed in claim 1, wherein the control valve changes its switching position if the system pressure reaches or drops below a predetermined minimum system pressure, or if the system pressure reaches or exceeds a predetermined maximum system pressure.

4. The arrangement as claimed in claim 3, wherein, based on a falling system pressure after the system pressure reaches or drops below the minimum system pressure, the control valve moves to the first switching position for a hydraulic connection of the pump to the system circuit.

5. The arrangement as claimed in claim 3, wherein, based on a rising system pressure after the system pressure reaches or exceeds the maximum system pressure, the control valve moves to the second switching position for a hydraulic connection of the pump to the lubrication circuit.

6. The arrangement as claimed in claim 1, wherein the control valve comprises a 3/2-way valve.

7. The arrangement as claimed in claim 1, wherein the holding valve unit is actuable depending on the system pressure.

8. The arrangement as claimed in claim 1, wherein the holding unit includes a control input connected to the system pressure and a restoring spring having a spring pressure set approximately to a minimum system pressure.

9. The arrangement as claimed in claim 1, wherein the mechanical locking mechanism has a locking protrusion which engages with a cutout in a locking arm of the control valve for releasably locking the control valve in the second switching position.

10. The arrangement as claimed in claim 1, wherein the holding unit includes a control input connected to the system pressure and a restoring spring having a spring pressure set approximately to a minimum system pressure, and the mechanical locking mechanism has a locking protrusion which engages with a cutout in a locking arm of the control valve for releasably locking the control valve in the second switching position.

11. A hydraulic arrangement for a vehicle transmission, comprising:
    a hydraulic pump for providing a system pressure for a first hydraulic system circuit and a lubrication pressure for a second hydraulic lubrication circuit;
    a control valve connected between a pump outlet of the pump and the two hydraulic circuits and having two different switching positions;

a holding valve unit including a mechanical locking mechanism for releasably locking the control valve in the second switching position; and a storage unit hydraulically connected to the system circuit;

wherein the control valve, depending on its switching position, acts as a hydraulic connection between the pump and the system circuit or between the pump and the lubrication circuit;

wherein the control valve changes its switching position if the system pressure reaches or drops below a predetermined minimum system pressure, or if the system pressure reaches or exceeds a predetermined maximum system pressure.

12. The arrangement as claimed in claim 11, wherein:

based on a falling system pressure after the system pressure reaches or drops below the minimum system pressure, the control valve moves to the first switching position for a hydraulic connection of the pump to the system circuit; and based on a rising system pressure after the system pressure reaches or exceeds the maximum system pressure, the control valve moves to the second switching position for a hydraulic connection of the pump to the lubrication circuit.

13. The arrangement as claimed in claim 11, wherein the control valve comprises a 3/2-way valve.

14. The arrangement as claimed in claim 11, wherein the holding valve unit is actuable depending on the system pressure.

15. The arrangement as claimed in claim 11, wherein the holding unit includes a control input connected to the system pressure and a restoring spring having a spring pressure set approximately to a minimum system pressure, and the mechanical locking mechanism has a locking protrusion which engages with a cutout in a locking arm of the control valve for releasably locking the control valve in the second switching position.

16. A hydraulic arrangement for a vehicle transmission, comprising:

a hydraulic pump for providing a system pressure for a first hydraulic system circuit and a lubrication pressure for a second hydraulic lubrication circuit;

a control valve connected between a pump outlet of the pump and the two hydraulic circuits and having a first and a second switching position; and a holding valve unit including a mechanical locking mechanism for releasably locking the control valve in the second switching position;

wherein the control valve, depending on its switching position, acts as a hydraulic connection between the pump and the system circuit or between the pump and the lubrication circuit.

17. The arrangement as claimed in claim 16, further comprising a storage unit hydraulically connected to the system circuit.

18. The arrangement as claimed in claim 16, wherein the control valve changes its switching position if the system pressure reaches or drops below a predetermined minimum system pressure, or if the system pressure reaches or exceeds a predetermined maximum system pressure.

19. The arrangement as claimed in claim 16, wherein:

when the system pressure reaches or drops below the minimum system pressure, the control valve moves to the first switching position for a hydraulic connection of the pump to the system circuit; and when the system pressure reaches or exceeds the maximum system pressure, the control valve moves to the second switching position for a hydraulic connection of the pump to the lubrication circuit.

20. The arrangement as claimed in claim 19, wherein the holding unit includes a control input connected to the system pressure and a restoring spring having a spring pressure set approximately to a minimum system pressure, and the mechanical locking mechanism has a locking protrusion which engages with a cutout in a locking arm of the control valve for releasably locking the control valve in the second switching position.

* * * * *